Oct. 31, 1933.    P. E. MATTHEWS    1,932,528
STEERING KNUCKLE
Filed Oct. 21, 1930
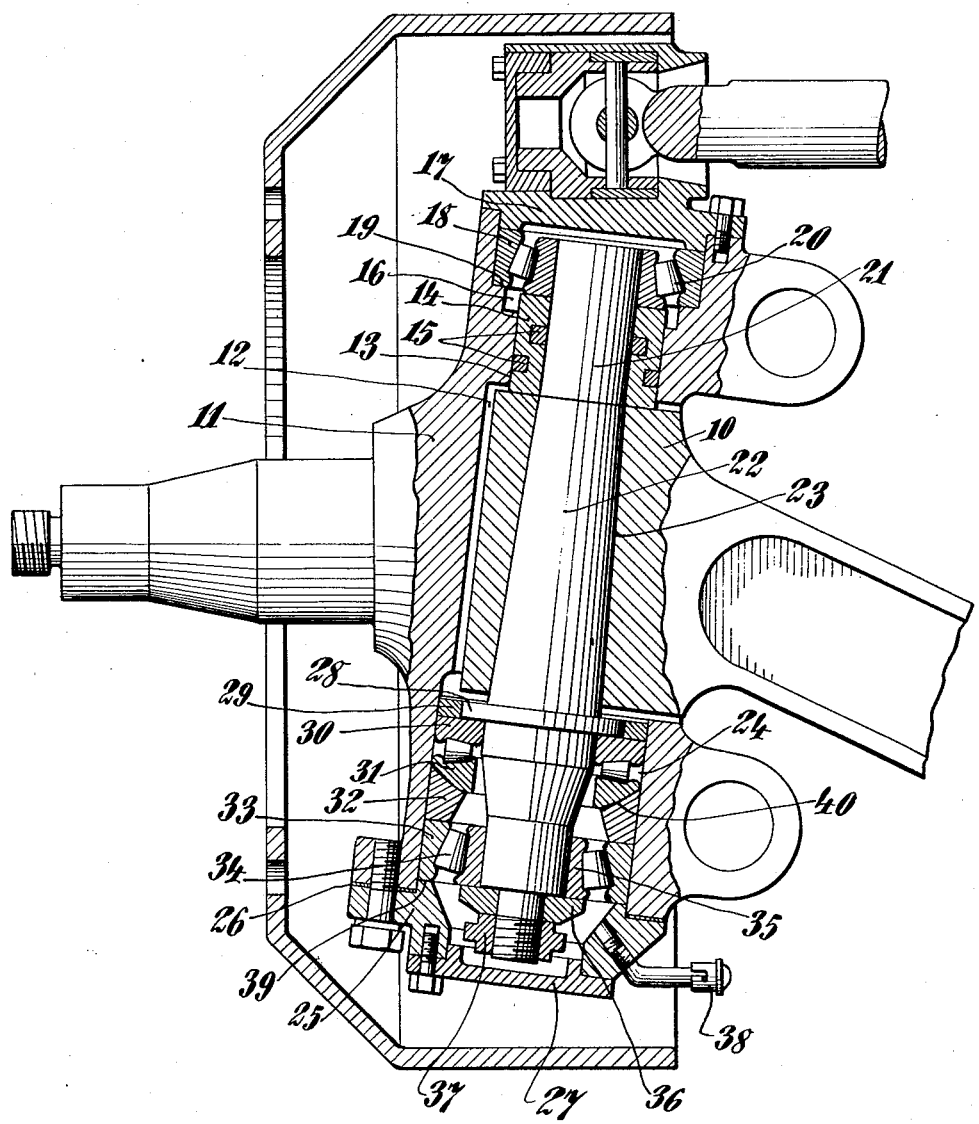
INVENTOR
*Philip E. Matthews,*
BY
Redding, Greeley, O'Shea + Campbell
*HIS ATTORNEYS*

Patented Oct. 31, 1933

1,932,528

UNITED STATES PATENT OFFICE 1,932,528

STEERING KNUCKLE

Philip E. Matthews, Plainfield, N. J., assignor to International Motor Company, New York, N. Y., a corporation of Delaware Application October 21, 1930. Serial No. 490,161

8 Claims. (Cl. 308—174)

The present invention relates to steering knuckles for motor vehicles and embodies an improved form of steering knuckle by means of which the knuckle bearings may be adjusted in a simple and accurate fashion.

More particularly, the invention embodies an improved steering knuckle constructed in such manner that the knuckle bearings may be adjusted in a single operation. In addition to the foregoing the knuckle construction embodied herein renders the steering of the vehicle more easy and effective than in existing forms of mechanisms.

It is therefore proposed to provide knuckle bearings of such character that all knuckle movements and stresses are taken through bearings fully able to journal the same effectively. For this purpose, the knuckle is provided with separate bearings to take the radial loads as well as the downward thrust load.

It is further proposed to provide bearing mountings which will allow a radial bearing to withstand the rebound or upward thrust load. In connection with the assembly of these elements, retaining means is provided to permit the adjustment of each bearing whenever required, the elements being accessible and positive in action.

In addition to the foregoing, it is proposed to provide a bearing structure for a knuckle wherein separate radial and thrust bearings are separately adjustable, the adjustment of the respective bearings being effected without disturbing the setting of the others.

A further object of the invention is to provide a separate thrust reaction member by means of which the thrust reaction between the spindle and axle is isolated from the related mechanism and separately transferred therebetween through the taper of the spindle.

It is a further object to provide a structure wherein the parts are designed to facilitate the manufacture thereof, particularly in accommodating a boring bar for removing metal from the knuckle to form a recess to receive the axle head.

Further objects, not specifically enumerated above, will be apparent as the invention is described in greater detail in connection with the accompanying drawing, wherein the single figure is a view in section taken in a plane passing through the axis of a knuckle constructed in accordance with the present invenion.

Referring more specifically to the above drawing, an axle head is shown at 10, being mounted within a recess 12 of a knuckle 11. An upper bearing 13 receives a bushing 14 within which sealing rings 15 are provided.

Within the upper portion of the knuckle, a bearing chamber 16 is formed, a cap 17 being secured over the same to close the chamber. A bearing race 18 is secured in position against a shoulder 19 by the cap, the bearing thus serving as the upper radial bearing 20 for a knuckle pin 21. The knuckle pin preferably is received by the bushing 14 and is formed with a taper 22 to engage a cooperating taper 23 in the axle head.

Below the recess 12 a bearing chamber 24 is formed, a cap 25 being provided to close the chamber. Shims 26 are mounted between the cap and knuckle to afford a means of adjusting the bearings in a manner to be described hereinafter. The cap is provided with a separately removable cover 27 which affords access to the lower end of the knuckle pin without disturbing adjustments made by the cap 25.

At the base of the taper 22, a flange 28 is formed, a sealing washer 29 being provided between the flange and the walls of the chamber 24. Bearing race 30 engages the flange 28 and thus serves as a thrust bearing for the knuckle pin. A cooperating bearing race 31 engages a spacing ring 32 which, in turn, engages a bearing race 33 for the lower radial bearing 34. Between the inner race 31 and the spacing ring, cooperating spherical bearing surfaces are formed to permit automatic alignment of the thrust bearing. The inner race 35 of the last named bearing is mounted on the lower end of the knuckle pin and is adjusted by a washer 36 and nut 37, threaded on the pin. Access to the nut 37 is had through the cover 27, as previously described, and lubrication of the bearing is effected through a fitting 38, carried by the cap 25. A similar fitting may be provided for the upper bearing and complete lubrication of all the bearings thus readily effected. A shoulder 39 is formed on the cap 25 to engage the bearing race 33 and thus effect adjustment.

The inner bearing races of the upper and lower radial bearings are slidable upon the cylindrical portions of the knuckle pin and thus may be readily adjusted. It will be noted that the knuckle pin housing is bored out at its lower end to a diameter sufficiently large to allow a boring tool to remove the metal of the forging straight through to the end of the axle head receiving recess. This obviates the necessity of boring as heretofore with inserted cutter to undercut the bore for the whole length of the gap, this being where the most metal must be removed, due to the gap being forged solid for half of the circumference of the knuckle pin housing at this point. A substantial saving in time and number of machining operations is thus afforded.

Since the thrust bearing and the upper radial bearing 20 are in series, only one adjustment is required for both. This adjustment is provided by means of the shims 26 and the adjustment of the bearing 40 is accomplished through consequent movement of spacing ring 32, thrust bearing, knuckle pin, axle head, and bushing 14. It will be seen that the lower radial bearing is adjusted by means of nut 37 without disturbing the setting of the other bearings. In this fashion, the respective bearings are independently adjustable, full adjustment being effected by only two operations.

As the thrust bearing is in series with and opposed to the upper radial bearing, the rebound thrust load will be taken axially by the latter. The angle of contact of this radial bearing is so oriented in relation to the line of thrust that it will take the rebound thrust load effectively.

The foregoing construction will be seen to space the radial bearings as far apart as possible, thus reducing the radial load thereof to a minimum. Locating the thrust bearing below the axle which it supports and transmitting the thrust to the flange on the knuckle pin rather than on the axle head causes the load to be carried through the taper of the pin, thus providing an additional safety feature since the load forces the pin upwardly against the taper.

By mounting the thrust bearing on the self-aligning spherical seats, any misalignment of the parts due to lack of accuracy in parallelism will be automatically taken care of, thus reducing to a minimum the possibility of cramping the thrust rollers. In this manner even distribution of the load over the bearing is insured.

While the invention has been described with specific reference to the accompanying drawing, it is not to be limited, save as defined in the appended claims.

I claim as my invention:

1. In combination with a knuckle and knuckle pin, an upper radial bearing, a lower radial bearing, a separate thrust bearing intermediate the first bearings, means to adjust the thrust bearing and the upper radial bearing, and separate means to adjust the lower radial bearing.

2. In combination with a knuckle and knuckle pin, an upper radial bearing, a lower radial bearing, a separate thrust bearing intermediate the first bearings, a spacing ring between the thrust bearing and the lower radial bearing, means to adjust the thrust and upper radial bearings, and separate means to adjust the lower radial bearing.

3. In combination with a knuckle and knuckle pin, an upper radial bearing, a lower radial bearing, a separate thrust bearing intermediate the first bearings, a spacing ring between the thrust bearing and the lower radial bearing, cooperating spherical bearing surfaces between the ring and the thrust bearing, means to adjust the thrust and upper radial bearings, and separate means to adjust the lower radial bearing.

4. In combination with a knuckle and knuckle pin, an upper radial bearing, a lower radial bearing, a flange on the knuckle pin between the said bearings, a thrust bearing engaging the flange, means to mount the thrust bearing on the knuckle, and means to adjust the bearings.

5. In combination with a knuckle and knuckle pin, an upper radial bearing, a lower radial bearing, a flange on the knuckle pin between the said bearings, a thrust bearing engaging the flange, a spacing ring between the thrust and lower radial bearings, and a cap to support the thrust and lower radial bearings on the knuckle.

6. In combination with a knuckle and knuckle pin, an upper radial bearing, a lower radial bearing, a flange on the knuckle pin between the said bearings, a thrust bearing engaging the flange, a spacing ring between the thrust and lower radial bearings, a cap to support the thrust and lower radial bearings on the knuckle, and means to adjust the position of the cap with respect to the knuckle.

7. In combination with a knuckle and knuckle pin, an upper radial bearing race carried by the knuckle, a cooperating bearing race carried by the knuckle pin, the last named race being slidable on the pin, a bushing on the pin engaging the last named race, and means to move the bushing with respect to the knuckle.

8. In combination with a knuckle and knuckle pin, an upper radial bearing race carried by the knuckle, a cooperating bearing race carried by the knuckle pin, the last named race being slidable on the pin, a bushing on the pin engaging the last named race, a taper on the pin below the bushing, a flange on the pin below the taper, a thrust bearing engaging the flange, a radial bearing below the thrust bearing, self-aligning spacing means between the thrust and lower radial bearing, and means to mount the bearings on the knuckle.

PHILIP E. MATTHEWS.